US009703817B2

(12) United States Patent
Hernandez-Sherrington et al.

(10) Patent No.: US 9,703,817 B2
(45) Date of Patent: Jul. 11, 2017

(54) INCREMENTAL INFORMATION INTEGRATION USING A DECLARATIVE FRAMEWORK

(71) Applicant: INTERNATIONAL BUSINESS MACHINES CORPORATION, Armonk, NY (US)

(72) Inventors: Mauricio A. Hernandez-Sherrington, Gilroy, CA (US); Lucian Popa, San Jose, CA (US); Li Qian, Ann Arbor, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 389 days.

(21) Appl. No.: 14/450,613

(22) Filed: Aug. 4, 2014

(65) Prior Publication Data
US 2016/0034478 A1 Feb. 4, 2016

(51) Int. Cl.
G06F 17/30 (2006.01)
(52) U.S. Cl.
CPC .. *G06F 17/30321* (2013.01); *G06F 17/30082* (2013.01); *G06F 17/30563* (2013.01)
(58) Field of Classification Search
None
See application file for complete search history.

(56) References Cited

U.S. PATENT DOCUMENTS 6,104,393 A 8/2000 Santos-Gomez
2014/0358932 A1* 12/2014 Brown .............. G06F 17/30445
707/741

FOREIGN PATENT DOCUMENTS

WO 2011091388 A2 7/2011

OTHER PUBLICATIONS

Qian, L. et al, "Declarative Incremental Information Integration." International Business Machines Corporation.
Hernandez, M. et al., "HIL: A High-Level Scripting Language for Entity Integration." International Business Machines Corporation.
Nica, A., "Incremental maintenance of materialized views with outerjoins." (2012)Information Systems, 37, p. 430-442.
"Special Issue of DOLAP 2010 Information Systems." (2012) Information Systems, 37, p. 391-392.

* cited by examiner

*Primary Examiner* — William Spieler
(74) *Attorney, Agent, or Firm* — Erik Huestis; Stephen Kenny; Foley Hoag LLP

(57) ABSTRACT

Embodiments of the present invention relate to a declarative framework for efficient incremental information integration. In one embodiment, a method of and computer program product for information integration is provided. An integration rule is received. A first data set is accessed. A first representation of the first data is generated set based on the plurality of integration rules. The first representation is flat and includes a plurality of records. At least one index is generated. The index encodes at least one hierarchical relationship among the plurality of records. A second representation is generated of the first representation based on the at least one index. The second representation comprising nested data.

20 Claims, 3 Drawing Sheets

INCREMENTAL INFORMATION INTEGRATION USING A DECLARATIVE FRAMEWORK

BACKGROUND

Embodiments of the present invention relate to information integration, and more specifically, to a declarative framework for efficient incremental information integration.

BRIEF SUMMARY

According to one embodiment of the present invention, a method of and computer program product for information integration are provided. An integration rule is received. A first data set is accessed. A first representation of the first data set is generated based on the plurality of integration rules. The first representation is flat and includes a plurality of records. At least one index is generated. The index encodes at least one hierarchical relationship among the plurality of records. A second representation is generated of the first representation based on the at least one index. The second representation comprises nested data.

DETAILED DESCRIPTION

Figure 1:
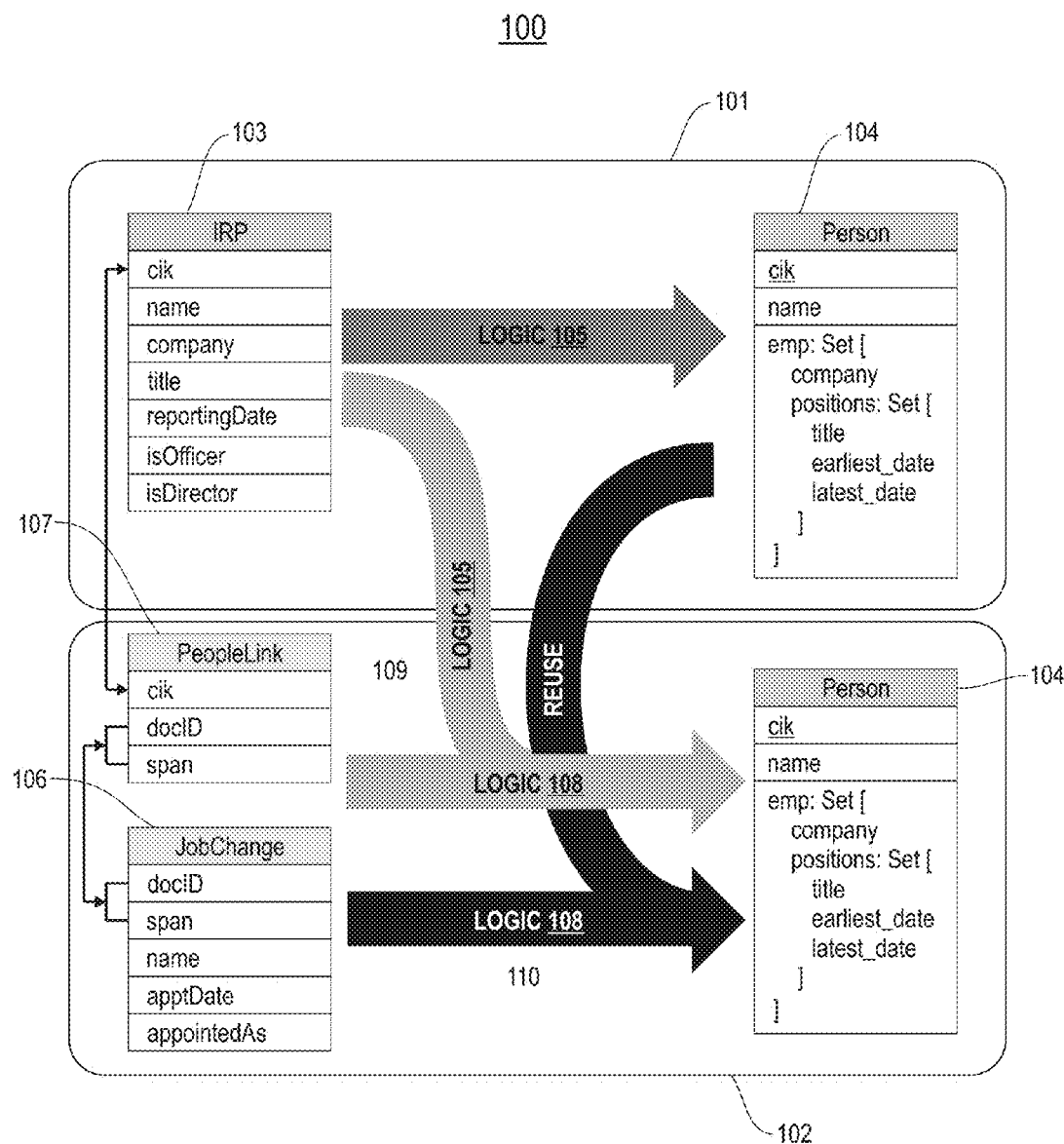
FIG. 1 depicts an exemplary integration strategy according to embodiments of the present disclosure.

Information integration is an important problem in the industry. Integration may involve heterogeneous sets of structured and unstructured data items that must be cleansed, normalized, linked and mapped into a set of target entities. There are now large public data sources that are constantly updated with new data and that can be combined with other external or internal (enterprise) data sources. For instance, some enterprises may wish to integrate data extracted from blogs and micro-blogs, from public data sources such as the U.S. Census or the U.S. Securities and Exchange Commission (SEC), or from knowledge bases like Wikipedia, DBLP, or IMDb. Integrated data may then be used for subsequent data analysis.

A challenge may arise when either new increments of source data (over the same source schema) become available, or when entirely new data sources (with new schemas) must be added into an incremental process. In the latter case, new integration rules may be required to account for the new type of data. Furthermore, the target schema itself may need to be adjusted to accommodate possibly new attributes. In both cases, there is a need to regenerate the integrated data, in an incremental way, without re-evaluating everything from scratch. This is important for efficiency reasons but also in cases where the previous source data or the previous integration rules are no longer available.

According to various embodiments of the present disclosure, a declarative incremental integration framework for complex nested data is provided. In some embodiments, this framework makes use of HIL, a declarative language for entity integration. HIL expresses the integration logic as rules that transform source "raw" records into target "entities". HIL has the ability to logically decompose a complex integration task into simple rules that are based on indexes, which may be advantageous for incremental integration. Consequently, subsequent information integration steps may be directed to only a few indexes (the ones that are relevant to the new increments of data). Furthermore, HIL supports type inference and record polymorphism, which in turn enables automatic refinement of the target schema in response to the new integration rules. The incremental integration framework of the present disclosure applies seamlessly to new increments of data and to additions to the integration logic. At one extreme of the spectrum is incremental view maintenance, which creates a new version of the target in response to changes in the input data (without any changes in the logic itself). At the other end of spectrum is view adaptation, which creates a new version of the target in response to changes in the integration logic itself (without any changes in the source data).

An incremental evaluation strategy according to various embodiments of the present disclosure is based on two stages: "chase" and "de-reference." The chase stage takes as input a set of integration rules and a data set, and generates a flat representation of the target data that uses index references to encode the hierarchical structure of the data. The chase makes use of HIL indexes. The de-reference stage can then be used to transform the flat result of the chase into the desired nested target data. While a naive implementation of de-reference would walk the flat data structure and recursively "inline" all index references with the actual values stored at the indexes, a more efficient alternative can be obtained by using an additional data structure that can also be incrementally maintained. This data structure, referred to herein as a reference summary graph (or reference summary), encodes all the possible types of references that may appear in a record. It enables development of an optimized de-reference algorithm that is based on generating a non-recursive set of queries with join operations.

With reference now to FIG. 1, an exemplary integration strategy according to embodiments of the present disclosure is depicted. For the purpose of this example, regular financial disclosures are considered. Public financial institutions and individuals connected to these institutions may be required to file periodic reports with regulatory agencies disclosing financial results, information about directors and board members, and stock transactions and holdings. These filings represent a rich set of sources of information that may form the basis for subsequent integration and data analysis.

Exemplary integration task 100 is divided into stages 101 and 102. Stage 101 involves a (non-incremental) mapping from one of the regulatory agency sources 103 (IRP, which stands for insider reports for people) into a target Person entity type 104. The set of integration rules that specifies this transformation is depicted as Logic 105. The expression of this logic in HIL is discussed further below. The role of Logic 105 is to create, for each person, a nested representation of all the information known about that person from all the insider reports. This information includes the unique id (in this example, cik), the name, as well as more complex structures such as the list of employment records with all the known companies for which the person worked, with all the positions held within each company, and with an understanding of the time-span for each position (based on all the records in IRP).

Stage 102 corresponds to adding a new data source 106 (Job Change, containing historical records mentioning when a person was appointed into a position or left a company)

into the integration flow. The new information is integrated into the existing Person entity data 104 in an incremental fashion. The new information may result in additional companies in the employment history, or additional positions, or perhaps changes in the earliest or latest date for a position, as more is learned from the new data source 106. One additional complication in this scenario is that the Job Change records 106 are extracted from text documents and do not include the actual unique identifier (in this example, cik) of a person. Thus, to link a Job Change record 106 to a known Person entity 104, a separate entity resolution step is performed that produces a set PeopleLink 107 of links between Job Change 106 and Person 104. The fieldsdocID and span, in this example, form an identifier for each Job Change record 106. The set of rules to map the new information from Job Change 106 (and PeopleLink 107) into Person 104 is embodied in Logic 108 (further details of which are provided below).

The default strategy to combine the data from the two sources according to some embodiments of the present disclosure is to take the union of Logic 105 and Logic 108 and evaluate it as if it were a single set of rules on top of both IRP 103 and JobChange 106. This strategy is depicted by combined arrow 109. One advantage to such an approach is that the compiler has access to all of the rules and all of the data, and hence it can stage appropriately all the transformation steps as well as the fusion that needs to be done across the two types of data. One disadvantage of this strategy is that it re-executes all of the integration steps for IRP 103 and Logic 105.

In another strategy according to embodiments of the present disclosure, depicted by combined arrow 110, the previous source data IRP 103 and the previous rules Logic 105 are not touched. Neither may be available anymore. Instead a new Person entity data 104 is created based only on Logic 108 and the new data source, while reusing the result of previous integration for Person 104. Such an incremental strategy must be equivalent (in terms of the final result) to the non-incremental strategy.

According to various embodiments of the present disclosure, algorithms that allow for the incremental integration strategy are provided, along with auxiliary data structures that are maintained in order to support this incremental strategy. In some embodiments, an incremental evaluation strategy is provided that is based on two stages: chase and de-reference.

The chase stage takes as input a set of integration rules and a data set, and generates a flat representation of the target data that uses index references to encode the hierarchical structure of the data. The chase makes use of HIL indexes. In the present example, chasing with the integration rules of Logic 105 will generate flat Person records 104 where the emp component is represented, lazily, by a reference to an index (Employment) that is populated separately by other rules. One advantage of this approach is that the population of Person 104 is decorrelated from the population of the Employment index. Furthermore, indexes are amenable for incremental evaluation, since a new chase stage with new integration rules or new source data will incrementally add into the relevant indexes. One of the key ideas of our approach is to materialize the flat result of the chase (containing "frozen" index references) as a data structure that can be reused and incrementally maintained.

The de-reference stage may then be used to transform the flat result of the chase into the desired nested target data. While a naive implementation of de-reference would walk the flat data structure and recursively "inline" all index references with the actual values stored at the indexes, a more efficient alternative can be obtained by using an additional data structure that can also be incrementally maintained. This data structure, referred to herein as a reference summary graph (or reference summary), encodes all the possible types of references that may appear in a record. It enables development of an optimized de-reference algorithm that is based on generating a non-recursive set of queries with join operations. Although the de-reference procedure itself is non-incremental, the efficiency of the generated queries allows achievement of good overall performance.

HIL provides: (1) entity types, which define the logical objects that users create and manipulate, and (2) declarative rules that transform entities. Entity types are represented in HIL's data model as nested-sets of values and records. A special form of entity types are indexes, which allow grouping of sets of values under a key value and facilitate the generation and maintenance of nested entities. An integration flow as depicted in FIG. 1 may be expressed using these attributes of HIL as described below.

According to some embodiments, relevant entity types may be defined in HIL as shown in Inset 1. The data model of HIL allows for sets and records that can be arbitrarily nested. In Inset 1, IRP and Person are both sets of records, whose types are only partially specified and will be inferred with more rules. Employment is declared to be an index (or finite map) that associates each key, in this case a record with a single cik value, to a set of record values containing the company name of the employer and a set of positions with that employer. This index will be used to associate the employment information of each Person identified by a cik. Positions and PositionInfo provide finer-grained information regarding the person's employment history, such as the titles the person has had in a specific company, or the dates that the person is known to have a given title in a given company.

---

Inset 1

IRP: set [cik: int, name: string, ?];
Person: set [cik: ?, name: ?, emp: set ?, ?];
Employment: fmap [cik: int]
    to set [company: string, positions: set ?];
Positions: fmap[cik:int, company:string]
    to set [title:string, earliest_date: ?];
PositionInfo: fmap[cik:int, company:string, title:string]
    to set [date: ?];

---

In some embodiments, a Person is created by the HIL rule of Inset 2. The semantics of the rule is one of containment. For every record in IRP, the existence of a Person entity is required with corresponding cik and name values. The emp field, however, is specified via an index look-up operation Employment![cik: i.cik], that is, emp will be assigned the value returned by probing the index Employment on the cik value. The population of the Employment index is specified using separate HIL rules such as provided in Inset 3. Here, for each IRP record, an index entry is constructed on each unique cik value. Since there might be more than one record in IRP with the same cik, each index entry will be a set of records computed from each group of IRP records with the same cik. In effect, this rule incorporates a group by operation on IRP. Note that the rule populates the nested positions set using a look-up into a separate Positions index. Following the same pattern as with Employment, the Positions index is defined in a separate rule m3 in Inset 4 that groups IRP records by cik and company. Similarly, another rule m4 in Inset 5 groups IRP records by an additional title field to populate PositionInfo. HIL may also allow UDFs (user-defined functions) in the rules. For instance, in order to populate the earliest_date in Positions, m3 applies an aggregation function minDate on the index look-up value from PositionInfo.

---
Inset 2
---
rule m1:  insert into Person
          select [cik: i.cik, name: i.name
              emp: Employment![cik: i.cik] ]
          from IRP i;
---

---
Inset 3
---
rule m2:  insert into Employment![cik: i.cik]
          select [company: i.company,
              positions: Positions![cik: i.cik, company: i.company] ]
          from IRP i where i.isOfficer = true;
---

---
Inset 4
---
rule m3:  insert into Positions![cik: i.cik, company: i.company]
          select [title: normTitle(i.title),
              earliest_date:
                  minDate(PosInfo![cik: i.cik,
                      company: i.company,
                      title: normTitle(i.title)])]
          from IRP i where i.isOfficer = true;
---

---
Inset 5
---
rule m4:  insert into PosInfo![cik: i.cik, company: i.company,
              title: normTitle(i.title)]
          select [date: i.reportingDate]
          from IRP i where i.isOfficer = true;
---

Indexes are included in HIL entity integration flows. They allow decorrelation to a complex nested mapping into several smaller rules, where each rule is focused on a particular aspect of a complex entity (e.g., employment but not positions). The HIL compiler figures out the necessary lower-level operations such as group-by, union, duplicate removal, and nesting of data, which ultimately assemble the complex entities. The type of logical decorrelation that HIL allows enables declarative incremental integration, because it offers an opportunity to incrementally enrich information at various levels in the entity hierarchy without affecting the rest of the target data.

The next step in the entity integration flow in FIG. 1 illustrates how to add JobChange 106 and PeopleLink 107 into the existing flow. JobChange records 106 will not add new Person entities 104. Instead, each matched JobChange record 106 (via PeopleLink 107) may result in the addition of new records to the employment list of a Person entity 104, or in the positions list. Two HIL rules specify how to add such records into the Employment and Positions indexes, given in Inset 6 and Inset 7. When multiple rules populate the same target entity, as in the case of rules m5 and m2, the resulting entity will contain a union of the results of those rules. When the entities are indexes, as in this case, a union is taken of all the keys as well as the sets of records stored under each key. No new target data structures (entities or indexes) are necessary. The new rules inserts new data into the same indexes declared by the initial mapping phase. This same pattern may apply when fusing any new data source.

---
Inset 6
---
rule m5:  insert into Employment![cik: l.cik]
          select [ company: j.company,
              positions: Positions![cik: l.cik, company: j.company] ]
          from JobChange j, PeopleLink l
          where j.docid = l.docid and j.span = l.span
              and isOfficer (j.appointedAs) = true;
---

---
Inset 7
---
rule m6:  insert into Positions![cik:l.cik, company: j.company]
          select [title: normTitle(j.appointedAs)]
          from JobChange j, PeopleLink l
          where j.docid = l.docid and j.span = l.span
              and isOfficer(j.appointedAs) = true;
---

In some embodiments, integration logic is specified in a HIL script using entity declarations and entity population rules, as described above. Denoting a HIL script as H, let I and O denote the input and output entity data, respectively. Let $P_H$ be an integration process derived from H. When that process takes as input a set of entities I and produces O, $P_H$ (I)=O.

Declarative Incremental Integration may be defined as follows. Given input entity data I, let H be an integration script such that $P_H$ (I)=O. Given an additional input $\Delta I$, possibly on a different schema than I, and an additional script $\Delta H$ that applies on $\Delta I$, the declarative incremental integration problem is to find an integration process P', such that $P'_{\Delta H}(O+\Delta I)=P_{H \cup \Delta H}(I+\Delta I)$.

Thus, the incremental integration process P' has access to the new rules $\Delta H$, the new input data $\Delta I$ and the result O of the previous integration (with H and I). It is not assumed that there is access to H or I. This makes the incremental integration process completely independent of the original integration in terms of both the input data, and the rules that were applied originally. The above definition covers the incremental view maintenance scenario, when the source data changes but the rules and the source schema remain fixed. In such case, $\Delta_H$ is set to be the same as H.

The equality condition at the end of the definition is a natural correctness condition which states that the result of the incremental process P' must be the same as applying the non-incremental process P on the union of I and $\Delta I$, based on the union of the rules in H and $\Delta H$.

This definition may be interpreted in the context of the example provided in FIG. 1. Stage one 101 corresponds to $P_H(I)=O$, where H is the set {m1-m4} of HIL rules, I is an IRP dataset and O is the first version of Person 104. In stage two 102, there is an additional script $\Delta_H$ given by the set {m5, m6} of HIL rules, and new input data $\Delta I$ for JobChange 106 and PeopleLink 107. Rather than executing $P_{H \cup \Delta H}(I+\Delta I)$ to obtain the second version O' of Person 104, an incremental method P' is required such that $P'_{\Delta H}(O+\Delta I)$ evaluates to the same O'.

Given an integration script H, it is assumed in the above definition that $P_H$ is some deterministic procedure that implements H. A concrete choice for $P_H$ is the result of compiling H to lower-level code, which can then be executed on a specific run-time engine. In an exemplary implementation of HIL, H is compiled to a Jaql script, which in turn runs on Hadoop. However, more general, two-staged semantics for H that is based on chase and de-reference may be used as set forth below. Correspondingly, a method P' is devised that is the incremental version of the two-staged semantics.

A question in the incremental integration problem is, given a ΔH and a ΔI, how is O reused to generate O'. A first answer is provided below, followed by an improved solution.

In one embodiment, ΔH is applied directly on ΔI, and then the result is merged with O. This is shown in Equation 1.

$$O' = P'_{\Delta H}(O + \Delta I) \triangleq O + P_{\Delta H}(\Delta I) \qquad \text{Equation 1}$$

In Equation 1, the second plus sign is used to represent the merge process. However, the semantics of this operation are not trivial because the data contains nested sets of records. The complexity of this merge is illustrated in the following example.

Referring back to the example depicted in FIG. 1, consider a specific person (a person with a specific cik) from the Person entity 104 generated in the first stage. This person is denoted by p and is shown inside Person as a JSON object below in Inset 8.

---
Inset 8
---
Person:[
 p: {"cik": 555,
  "name": "Bob Smith",
  "emp": [{ "company": "Nest Bank",
   "positions": [
    {    "title": "CEO",
      "earliest_date": 2008-12-31 }] }]
 }...]
---

Consider the introduction of new information regarding this specific person from Job Change 106, as shown at Inset 9.

---
Inset 9
---
JobChange:[
 j1: { "cik": 555, "name": "Bob Smith", "company": "Nest Bank", "appointedAs": "CEO", "apptDate": 2004-12-31}
 j2: { "cik": 555, "name": "Bob Smith", "company": "Nest Bank", "appointedAs": "CFO", "apptDate": 2002-12-31}
 j3: { "cik": 555, "name": "Bob Smith", "company": "Save Bank", "appointedAs": "CFO", "apptDate": 1998-12-31}
 ...]
---

By applying $P_{\Delta H}(\bullet)$ on JobChange 106, ΔPerson is obtained, which contains the incremental part (δp) of the person, as shown in Inset 10.

---
Inset 10
---
ΔPerson:[
 δp:{"cik": 555,
  "name": "Bob Smith",
  "emp": [{ "company": "Nest Bank",
   "positions": [
    { "title": "CFO",
      "earliest_date": 2002-12-31 },
    { "title": "CEO",
      "earliest_date": 2004-12-31 }]},
---

---
Inset 10 -continued
---
 { "company": "Save Bank",
  "positions": [
   { "title": "CFO",
     "earliest_date": 1998-12-31 }]}]
}...]
---

Now δp in ΔPerson is merged with p in Person. A natural way of doing this, which relies on recursively merging the set-valued attributes of any two records with the same atomic-valued attributes, yields a new person p' in Person' as shown in Inset 11.

---
Inset 11
---
Person'[
 p' :{"cik": 555,
  "name": "Bob Smith",
  "emp": [{ "company": "Nest Bank",
   "positions": [
    { "title": "CFO",
      "earliest_date": 2002-12-31 },
    { "title": "CEO",
      "earliest_date": 2004-12-31 }]},
   { "company": "Save Bank",
    "positions": [
     { "title": "CFO",
       "earliest_date": 1998-12-31 }]}]
 }...]
---

This merge operation is non-trivial. This is primarily because such a merge occurs at each level of the entity. Specifically, since j3 contains employment history from a new company ("Save Bank"), corresponding employment information has to be added to the emp set in p (line 12-16 in p'). Moreover, because j2 reveals that this person was once appointed as the CFO in Nest Bank, the positions set inside emp in p has to be enriched accordingly (line 6-7 in p'). Finally, for the same company Nest Bank and same position CEO, the entry in positions of p (line 6-7) needs to be merged with that of δp (line 8-9), and update the earliest_date to 2004 Dec. 31 in p' (line 9). This update is challenging, because it applies the incremental semantics (a binary min) of the aggregation function minDate. In case the function is holistic, the update will simply fail.

In summary, to perform such a merge, the structure of p and δp must be traversed simultaneously (starting from emp in this case). If δp contains a new entry (entry with a new set of values for the atomic fields defined in the rules, such as company: "Save Bank"), it is added to the corresponding set in p. Otherwise, the entries from δp and p contain the same set of values for those atomic fields (company: "Nest Bank"), thus the merge is recursively performed for any index-lookup attributes (Positions in this case). Moreover, atomic values reduced by aggregate functions have to be merged according to the incremental semantics of such functions. This is a recursive union procedure. To distinguish it from traditional union on flat sets, it is termed deep-union and denoted by $\uplus$.

Deep-union may be used in various contexts related to merging of nested data. It is also related to the partitioned-normal form that requires that the atomic-valued attributes in a set of records functionally determines the set-valued attributes, at any level. With deep union, Equation 1 may be rewritten as Equation 2.

$$O' = P'_{\Delta H}(O + \Delta I) \triangleq O \uplus P_{\Delta H}(\Delta I) \qquad \text{Equation 2}$$

Given that output entity O is materialized, this kind of deep-union is inefficient. This is because one has to drill into the hierarchical structure in O and append or update deeply nested data. Moreover, merging O and $P_{AH}$ (ΔI) with deep-union does not necessarily produce the same result as applying $P_{H \cup AH}$ on I+ΔI. This is because HIL allows for a finer-grained merging of nested data based on indexes. For example, even if the name in δp is different (possibly due to data inconsistencies), as long as δp has the same cik, HIL requires it to be merged with p, since the employment field only depends on cik. Finally, if information is previously aggregated, deep-union needs to incrementally update these aggregated values, which can be extremely challenging. Thus, a different incremental integration strategy as outlined below may be more efficient.

One reason incremental integration is challenging is that, once the nesting structure of the output entities is fully materialized, it becomes hard to reuse its content for subsequent integration stages. Thus, there is a need for a way to generate partial integration results that have a relatively simple structure and can be easily assembled to produce the complete output. Subsequent integration stages may benefit from this by reusing these simple partial results instead of the fully nested output. According to embodiments of the present disclosure, a method for generating such simpler partial results and a way to assemble them are provided.

Given an input I and a set of HIL rules H, each HIL rule in H is applied independently on I to generate a partial flat output, so that the atomic attributes in the select clause of the rule are populated with actual data from I, while the index-referring attributes are encoded with corresponding index references. This process is referred to herein as chase. Formally, it is referred to as chase I with H, and denoted by $C_H(I)$.

How chase works may be illustrated with reference to the prior example, focusing on the relevant entry in IRP for a specific person. The relevant entry is shown in Inset 12.

---
Inset 12
---
IRP:[
  i: { "cik": 555, "name": "Bob Smith", "company": "Nest
    Bank", "title": "CEO", "reportingDate": 2004-12-31}
...]

---

IRP is first chased with m1', and a flat version of Person is obtained. To do so, for each entry (e.g., i), its atomic attributes selected in m1' (e.g., cik and name) are projected, while populating the nested set (e.g., emp) with an index reference, which is a record consisting of the name of the referred index and a lookup key. The chase result is denoted by $Person_c$ as shown in Inset 13. The reference in emp (highlighted by REF) says the actual content of emp can be found in an index Employment with the key {"cik":555}.

---
Inset 13
---
$Person_c$:[
  $p_1$: { "cik": 555,
    "name": "Bob Smith",
    REF: "emp": { "index": "Employmentc",
      "key": {"cik": 555} } }...]

---

$Employment_c$ can be obtained in a similar manner by chasing IRP using m2. Since Employment is an index itself, the chase result is a set of key-value pair. The key is the index lookup key to its set-valued entry, and each element in the value set is populated in the same way as before as shown in Inset 14.

---
Inset 14
---
$Employment_c$:[
  $e_1$: {"key": {"cik": 555},
    "values": [{
      "company": "Nest Bank",
    REF: "positions":{ "index": "Positionsc",
      "key": {"cik": 555,
      "company": "Nest Bank"}
    } }] }...]

---

Chase of IRP continues using m3, and Positions is obtained. In cases where UDFs are employed for aggregation, the name of such UDFs (e.g., function) must be provided as well as shown in Inset 15.

---
Inset 15
---
$Positions_c$:[
  $po_1$: { "key": { "cik": 555,
    "company": "Nest Bank" },
  "values": [{
    "title": "CEO",
  REF: "earliest_date": {
    "index": "PositionInfoc",
    "key": { "cik": 555,
      "company": "Nest Bank",
      "title": "CEO" },
    "function": "minDate" } }] }...]

---

Finally, IRP is chased with m4 in the same way, to produce $PositionInfo_c$. The result is a set of a series of partial integration results using m1-m4 as shown in Equation 3.

$$C_H(IRP)=\{Person_c, Employment_c, Positions_c, PositionInfo_c\} \quad \text{Equation 3}$$

In contrast to the fully nested integration result, these chase results are flat data structures. That is, for each entry in the top-level entity and in the value set of each index in the chase results, only atomic values and index references are recorded. Future integration stages can benefit from this fact, and will utilize these flat structures as partial results instead of using a fully nested structure, as discussed further below.

Chase produces partial results that are de-correlated from each other by index references. In contrast, one can chase the pointers (or references) and inline them with the corresponding values to construct the complete result. This process is referred to as de-reference herein. For example, if a $Person_c$ has a reference to an index Employment, then de-referencing means, first making sure that all the entries in Employment are de-referenced (recursively), then replacing the reference inside the $Person_c$ with the value that is obtained by looking up the de-referenced entry in Employment with the given key. If needed, the function that may be encoded with the reference must also be applied.

It is possible for different entries in $Person_c$ to refer to different indexes. For instance, suppose there is another rule m', which is identical to m except that it uses a new index $Employment_1$ to populate Person. In this case, there also exist records in $Person_c$ that refer to $Employment_1$ from the emp field. Then de-referencing will use the (de-referenced) value from $Employment_1$ (not Employment).

As an example, the chase results provided above may be de-referenced. De-referencing starts from the deepest level of the recursion, where $Positions_c$ is de-referenced with $PositionInfo_c$. According to the reference in the earliest_date field in $Positions_c$, the corresponding entry in $PositionInfo_c$ is looked up with the key consisting of three attributes (cik, company and title). The retrieved entry is a set of dates. Since there is a UDF minDate in this example, this function is applied to the set of dates, and the result is used to replace the value of earliest_date in Positions$_c$.

The process continues to de-reference Employment with the dereferenced Positions$_c$. For the positions field in Employment$_c$, its key is used to look for the corresponding entry in Positions$_c$. Since no function is presented, the positions field is directly replaced in Employment$_c$ by the retrieved value (the set of positions). Finally, Person$_c$ is processed in a similar manner.

By denoting the de-reference procedure by D, the above process can be written according to Equation 4.

$$D(Person_c, Employment_c, Positions_c, PositionInfo_c) = Person \quad \text{Equation 4}$$

The execution of such a de-reference procedure can be highly inefficient (especially with a recursive implementation). Thus, a non-recursive implementation of de-reference is provided below. In this implementation, it is described how to abstract the de-reference logic into a data structure (namely reference summary), which is stored together with $C_H(I)$ and can be compiled into a set of optimized queries using join operations. In addition, it is shown how the reference summary can be maintained in an incremental scenario, with significant performance benefits.

The chase and dereference procedure may be summarized with Equation 5.

$$D(C_H(I)) = P_H(I) = O \quad \text{Equation 5}$$

Equation 5 suggests, first, a more systematic way to perform integration tasks. That is, it is always possible to chase the input using individual HIL rules, produce partial and flat results that encode the result via index references, and then de-reference the chase results to construct the final output. Secondly, the partial results that result after chasing have the advantage that they can be more easily and efficiently merged with new data resulting from new rules or new source data.

Given an additional input ΔI and an additional integration script ΔH, a baseline procedure according to embodiments of the present disclosure integrates everything from scratch as shown in Equation 6.

$$O' = P_{H \cup \Delta H}(I + \Delta I) \quad \text{Equation 6}$$

Given the previous definitions of chase and de-reference, decompose this procedure can be decomposed into the two phases as shown in Equation 7.

$$O' = D(C_{H \cup \Delta H}(I + \Delta I)) \quad \text{Equation 7}$$

Since chase is distributive (a property which is explained further below), Equation 7 can be rewritten as shown in Equation 8.

$$O' = D(C_H(I) + C_{\Delta H}(\Delta I)) \quad \text{Equation 8}$$

$C_H(I)$ represents the result of chase over the previous input, which is assumed to be materialized and reusable. Equation 8 suggests that O' can be incrementally computed by computing $C_{\Delta H}(I)$, the chase with the new logic over the new data increment, followed by a merge between the two chase results. Computing $C_H(I)$ follows the same chase procedure discussed above.

Since the results of chase are flat, the semantics of merge are almost the same as set union. When merging top-level entities such as Person$_c$, merge as a set union. When entities are indexes (e.g., Employment$_c$), the semantics is richer: for each key, the union is determined of the associated values from both indexes (each is a set of entries). The resulting set is then associated to the same key.

Merge is now illustrated in light of the above example. First, $C_{\Delta H}(\Delta I)$ is computed, where ΔI is the JobChange including j1-j3 described above. By chasing this JobChange with m6, Positions$_c$ is generated as shown in Inset 16.

---
Inset 16
---

ΔPositionsc:[
    δpo$_1$: { "key": { "cik": 555,
                "company": "Nest Bank" },
        "values": [{
           "title": "CEO",
        REF: "earliest_date": {
           "index": "PositionInfoc",
           "key": { "cik": 555,
               "company": "Nest Bank",
               "title": "CEO" },
           "function": "minDate" } },
    { "title": "CFO",
        REF: "earliest_date": {...} }] }
    δpo$_2$: { "key": { "cik": 555,
                "company": "Save Bank" },
        "values": [{
           "title": "CFO",
        REF: "earliest_date": {...} }] }...]

---

ΔPositions$_c$ is then merged with Positions$_c$. For each key, the sets of associated entries is retrieved from both indexes, the union is determined, and the result is associated with the same key. For example, for the key {"cik":555, "company": "Nest Bank"}, since the value for po$_1$ is a proper subset of the value for δpo$_1$, the result is identical to that in δpo$_1$.

Similarly, chasing JobChange with m5 produces ΔEmployment$_c$, as shown in Inset 17.

---
Inset 17
---

ΔEmployment$_c$: [
    δe$_1$:{"key": {"cik": 555},
        "values": [{
           "company": "Nest Bank",
        REF: "positions":
           { "index": "Positionsc",
              "key": {"cik": 555,
                    "company": "Nest Bank"} } },
    { "company": "Save Bank",
        REF: "positions": {...} }] }...]

---

Since for the key {"cik":555}, the values in e$_1$ is a proper subset of that in δe$_1$, merging Employment$_c$ with ΔEmployment$_c$ results in a Employment'$_c$ that is equal to ΔEmployment$_c$. Since ΔH does not modify Person or PositionInfo, Person$_c$ and PositionInfo$_c$ remain the same after the merge.

This merge operation is called c-union and is denoted herein as ⊔. The semantics of c-union is important to the incremental solution with chase and de-reference, because it guarantees the distributivity of the chase operation. That is, chasing I+ΔI produces the same result as taking a c-union of the results of chasing I and ΔI independently. Furthermore, because I is independent of ΔH and ΔI is independent of H, the relations may be described as shown in Equation 9.

$$C_{H \cup \Delta H}(I + \Delta I) = C_H(I) \sqcup C_{\Delta H}(\Delta I) \quad \text{Equation 9}$$

After performing the c-union between the old and new chase results, the results are de-referenced. As noted above, the naïve de-reference procedure can be highly inefficient. Therefore an optimized de-reference algorithm based on efficient join queries is provided below.

In order to optimize the de-reference procedure according to some embodiments of the present disclosure, it is translated into a list of optimized non-recursive queries. In some embodiments, a bottom-up approach is chosen to avoid any recursion. For the purposes of illustration only, $PositionInfo_c$ is omitted, and thus in the present example, $Employment_c$ is dereferenced with an already de-referenced $Positions_c$.

The de-reference process approximates a join operation, where $Employment_c$ is joined with $Positions_c$ by matching the key in the positions field of $Employment_c$ with the top-level key in $Positions_c$. We then project the value from $Positions_c$ to the positions field in $Employment_c$, with the other fields of $Employment_c$ intact.

However, the key used in the join condition from $Employment_c$ is embedded in the values field, which contains a set of entries. As a result, $Employment_c$ must be flattened before joining it with $Positions_c$. Here "flatten" means, for each entry in $Employment_c$, a natural join is performed of the values set with the top-level key and the entry is replaced with the result set. Since the semantics of such a "flatten" operation is similar to a Unnest operator, the flatten process may be denoted as shown in Equation 10.

$$Employment_c \leftarrow Unnest_{key}(Employment_c) \quad \text{Equation 10}$$

Then the join query can be described as per Equation 11.

$$Employment_c \leftarrow Employment_c \bowtie Positions_c | Employment_c.positions.key=Positions_c.key \quad \text{Equation 11}$$

After this the original nested structure for $Employment_c$, can be recovered by re-grouping the entries under the same key. Similarly, the Nest operator from nested relational algebra may be used and the process denoted as shown in Equation 12.

$$Employment_c \leftarrow Nest_{key}(Employment_c) \quad \text{Equation 12}$$

This completes the de-reference process for $Employment_c$. The process then moves up to $Person_c$, and de-references it with the de-referenced $Employment_c$. Since $Person_c$ is the top-level entity with a flat structure, it is not necessary to unnest and nest it. Only the join query given in Equation 13 is required.

$$Person_c \leftarrow Person_c \bowtie Employment_c | Person_c.emp.key=Employment_c.key \quad \text{Equation 13}$$

These join queries can be extended to handle UDFs, regardless of the property of these functions (whether aggregative, whether holistic, etc.). Given a UDF, it may be applied on the set of values joined from the referred index before projecting it to the output.

The above depicts the types of non-recursive join queries that efficiently inline all index references. To derive these queries, it is necessary to maintain some information on the kind of references inside each entity record. In some embodiments, this information is stored in a data structure called reference summary. The reference summary is only needed at compile time.

Figure 2:
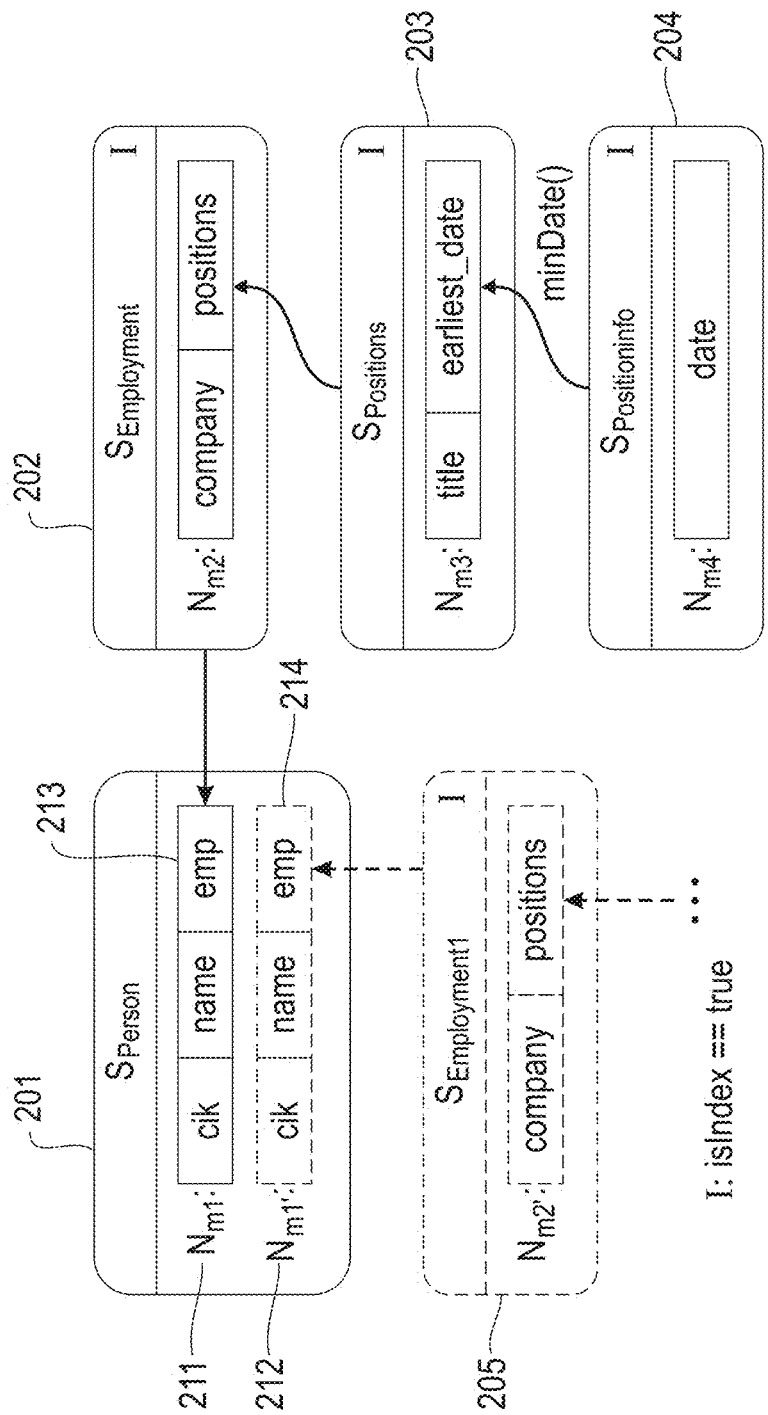
FIG. 2 depicts an exemplary reference summary data structure according to embodiments of the present disclosure.

Referring now to FIG. 2, an exemplary reference summary is depicted. According to various embodiments of the present disclosure, the reference summary is a graph of the reference relationships in a decomposed nested entity.

In some embodiments, an entity node N is an object with a name and a set of attributes A. The name is denoted herein by N.name and the set by N.attrs, where N.attrs= $\{A_1, A_2, \ldots, A_{MN}\}$. An attribute $A_i$ is referred to by N.attrs.$A_i$. Given an integration script H, each HIL rule naturally translates into an entity node. For instance, an entity node $N_{m1}$ is created for m1 and it is assigned the name Person and the attribute set {name, cik, emp}. Similarly, $N_{m2}$ has name Employment and attribute set {company, companyCik, positions}. The set of entity nodes derived from H is denoted by U.

In some embodiments, a super node S is an object with a name S.name, a flag S.isIndex and a set of entity nodes S.nodes. The flag is true iff the corresponding entity is an index, and S.nodes=$\{N | N \in U \land N.name=S.name\}$. Super node captures the fact that several integration rules may use different indexes to populate the same entity. For example, m1 and m1' both populate Person but with different employment indexes. If the super node for Person is denoted by $S_{Person}$, $S_{Person}$.nodes=$\{N_{m1}, N_{m1'}\}$. The set of super nodes derived from H is denoted by V. Given a super node S, $S_c$ is used to refer to the chase result corresponding to the entity with S.name.

In some embodiments, a reference edge E is a directed edge pointing from a super node S to an attribute A in attrs of some entity node N, and annotated with a function name. The super node is denoted by E.from, the attribute by E.to and the function by E.func. Reference edges reflect how the entities refer to each other. For instance, if the super node of Employment is denoted by $S_{Employment}$, m1 implies a reference edge $E_1$, pointing from $S_{Employment}$ to $N_{m1}$.attrs.emp. Since no UDF is applied here, $E_1$.func=null. The set of all edges is denoted by W. Given an edge E and a super node S, E→S, if $\exists N \in S$.node, s.t. E. to $\in N$.attrs.

For the purposes of the present example, an exemplary reference summary K is a triple (U, V, W).

FIG. 2 depicts an example reference summary corresponding to the present example, where structures with solid line 201 ... 204 represent the de-reference logic implied by m1-m4, and the ones with dashed line 205 come from additional rules (m1', m2', etc.). In $S_{Person}$, 201 there are two entity nodes, $N_{m1}$ 211 and $N_{m1'}$ 212. While the emp attribute 213 in $N_{m1}$ is pointed by $S_{Employment}$ 202, the emp in $N_{m1'}$ 214 is pointed by $S_{Employment1}$ 205. This reflects the fact that the same field emp in Person is populated by different indexes, and indicates, during de-referencing, how to inline the correct index to construct the fully nested output.

Given a reference summary, it can be compiled to a sequence of optimized queries by first traversing its super nodes in certain order, and de-referencing the entity represented by each node. The de-reference result is order-independent because the chase results are decorrelated from each other. However, a topdown manner may be computationally expensive (similar to the naïve recursive implementation), since the deeper in the summary it goes, the deeper in the entity structure where de-reference occurs. Thus a bottom-up traverse order is chosen in certain embodiments.

The generation of a traverse order on a reference summary graph is similar to a topological sort on a DAG. Thus, in some embodiments it may be presented by reusing a topological sort. To do this, a new edge set is constructed: $W_T \leftarrow \{(S_1, S_2) | S_1, S_2 \in V \land \exists E \in W \text{ s.t. } E.from=S_1 \land E \rightarrow S_2\}$. Any standard topological sort algorithm may then be employed to generate an order of super nodes following the directions in the newly defined edge set. This process is denoted by: $L \leftarrow TraverseOrder(|\Delta K) \triangleq TopologicalSort(V, W_T)$.

The super node S is processed from L in order. For each S, the procedure provided in Inset 18 is invoked.

Inset 18

```
procedure De-reference(S)
    P← empty entity                         ▷ Initialize
    for N ∈ S.nodes do                      ▷ Iterate over entity nodes
        Q←S_c                               ▷ Retrieve the chase result
        if S.isIndex then                   ▷ If index, flatten it
            Q←Unnest(Q,value)
        end if
        for E ∈ {E|E ∈ W ∧ E.to ∈ N.attrs} do
            T←E.from
            A←E.to
            R = T_c                         ▷ Get the referenced entity
            Q←Q ⋈ R|Q.value.A.key =         ▷ Join
              R.key, E.func
        end for
        if S.isIndex then                   ▷ If index, re-group it
            Q←Nest(Q, key)
        end if
        P←P ⊔ Q                             ▷ C-Union results
    end for
    S_c←P                                   ▷ Update the chase result
end procedure
```

Given a super node S, the Algorithm of Inset 18 iterates over the entity nodes under S (line 3). For each entity node N and each reference inside N (line 8), the referenced chase result is retrieved (already de-referenced according to traversing order) and joined into the referring attribute (line 12). The function, if presented, will be applied during the join. Since join only works on flat structure, if S is an index, it is unnested before the join and nested after the join (line 6, 15). Finally, the c-union is taken of the de-reference results from each entity node (line 17) and update the chase result (line 19).

In an incremental scenario, as the de-reference logic is being enriched, the summary is also subject to evolution. Instead of computing the new summary from scratch, it is preferable to incrementally maintain the old summary. Formally, if the incremental part of the summary is denoted by $\Delta K$ and the new summary by $K'$, the goal is to find a way to merge K with $\Delta K$ to produce $K'$.

In another example, in a following incremental stage, a new data set is absorbed that includes information about the company boards the person has been on. Thus there is a new index Board, together with a new rule m7, which is identical to m1 except for that it adds a new attribute board to Person and populates it with an index look-up in Board with cik.

First $\Delta K$ is generated, which contains the corresponding super nodes and entity nodes for Board and Person, together with new reference edges indicated by m7. $\Delta K$ is then merged onto K by traversing $\Delta K$ using the order described above. For Board, since it is new, the corresponding super node and entity node, together with relevant edges are directly copied from $\Delta K$ to K. For Person, however, because it exists before, the old super node $S_{Person}$ must be merged with the new one $S'_{Person}$. Initially the entity nodes are merged. Since the new entity node $N_{m7}$ from $S'_{Person}$ contains a new attribute board, the old entity node $N_{m1}$ must be expanded accordingly. After this, the two nodes are merged with relative edges updated.

Not every new entity node can be merged with an old one. For instance, if H contains m1', $N_{m1'}$ cannot be merged with $N_{m7}$, since m1' populates emp with a different index ($Employment_1$). In contrast, $N_{m1}$ can be merged with $N_{m7}$, since the attributes and referenced indexes from both nodes are identical except for the new board. Formally, $N_{m1}$ is said to be contained in $N_{m7}$ given W and $\Delta W$, or $N_{m1} \leq N_{m7} | W, \Delta W$. Given this notion of containment, the merge algorithm is provided in Inset 19.

Inset 19

```
procedure MergeSummary(K,K)
    L←TraverseOrder(ΔK)                     ▷ Sort new nodes
    while ¬L.isEmpty( ) do
        S' ←L.head( )
        S←S|S ∈ V ∧ S.name = S'.name        ▷ Find match
        if S = null then                    ▷ Add super node
            V←V ∪ {S'}, U←U ∪ {S'.nodes}
            W←W ∪ {E|E ∈ ΔW ∧ E → S'}
        else                                ▷ Merge super node
            R←{E|E ∈ W ∧ E.from = S}
            for E ∈ R do                    ▷ Update outgoing
                E.from←S'                      edges
            end for
            for N ∈ S.nodes do              ▷ Update entity nodes
                N' ←N'|N' ∈ S'.nodes ∧ N ≼ N'|W, ΔW
                if N' = null then           ▷ Expand old entity
                    S.nodes←S.nodes\{N}         node
                    N←Expand(N)
                    S'.nodes←S'.nodes ∪ {N}
                else                        ▷ Merge entity nodes
                    R←{E|E ∈ W ∧ E.to ∈ N.attrs}
                    for E ∈ R do
                        A←E.to, E.to←N'.attrs.A
                    end for
                    U←U\{N}, U←U ∪ {N'}
                end if
            end for
            V←V\{S}, V←V ∪ {S'}             ▷ Move node
            W←W ∪ {E|E ∈ ΔW ∧ E → S'}       ▷ Add edges
        end if
    end while
end procedure
```

First the super nodes from $\Delta K$ are retrieved according to the order described above (line 2). For each node S', it is checked if there exists a node S in K representing the same entity (line 5). If no, this node is added to K (line 7-8). Otherwise, the structure is updated as follows.

For inter-node structure, for each edge pointing from S, their source is changed to S' (line 10-12). For any edge that points to some entity node in S', they are added to K (line 29). For intra-node structure, for each entity node N in S it is checked if there is any entity node N' in S' that contains N (line 15). If no, N is expanded and moved to K (line 17-19). Otherwise, relative edges are relinked so that edges originally pointing to N now point to N' (line 21-24). This process proceeds until all new nodes are merged.

Figure 3:
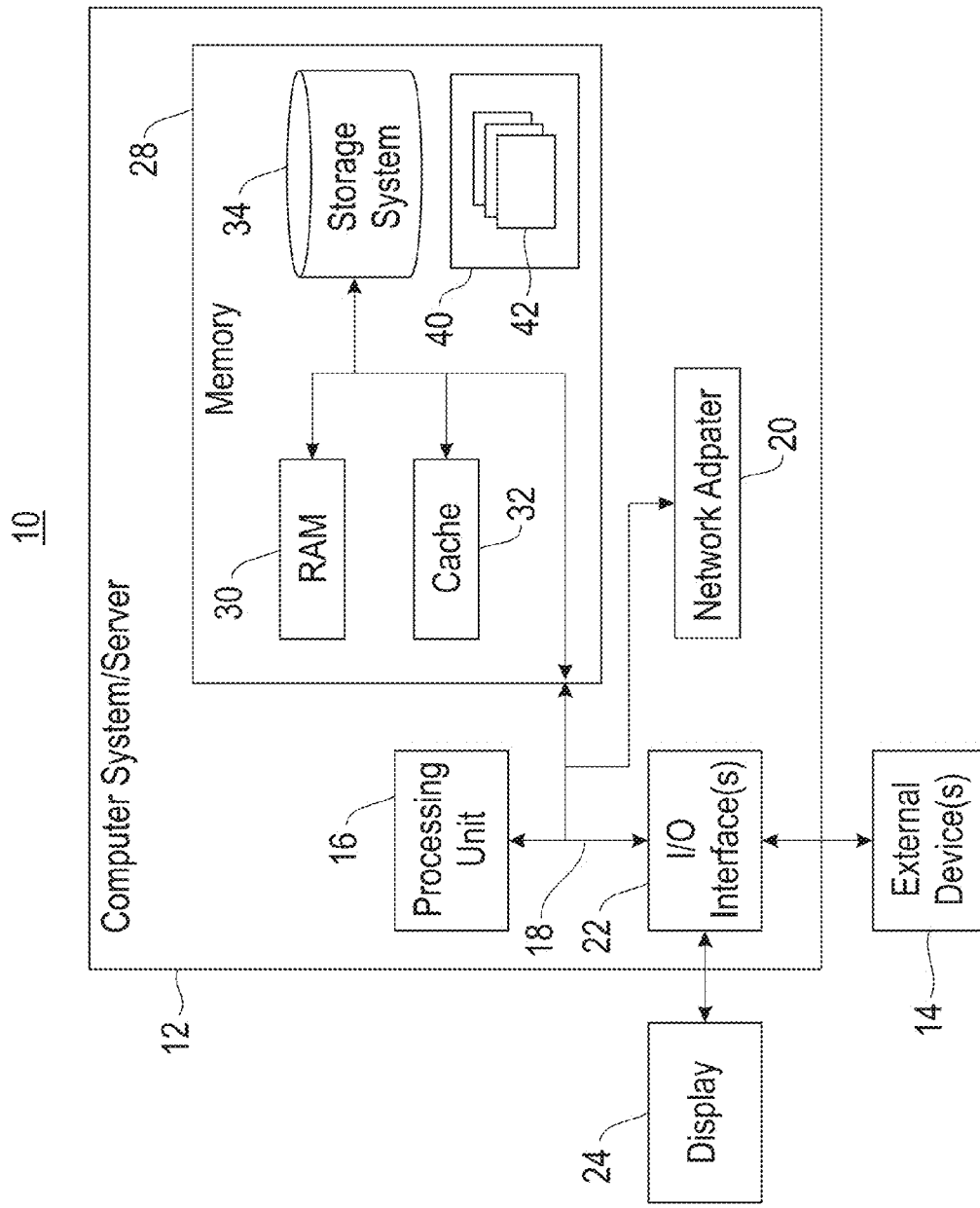
FIG. 3 depicts a computing node according to an embodiment of the present invention.

Referring now to FIG. 3, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a plurality of integration rules;
   accessing a first data set;
   generating a first representation of the first data set based on the plurality of integration rules, the first representation being flat and comprising a plurality of records;
   generating at least one index, the index encoding at least one hierarchical relationship among the plurality of records;
   generating a second representation of the first representation based on the at least one index, the second representation comprising nested data; and
   maintaining a data structure comprising a set of potential hierarchical relationships among the plurality of records.

2. The method of claim 1, wherein generating the first representation comprises:
   executing the chase algorithm.

3. The method of claim 1, wherein the first representation further comprises a plurality of index references and wherein generating the second representation comprises:
   inlining the plurality of index references.

4. The method of claim 1, wherein the data structure comprises:
   a plurality of nodes, each of the plurality of nodes corresponding to one of a plurality of integration rules and comprising an attribute;
   a plurality of supernodes, each of the plurality of nodes being associated with one of the plurality of supernodes;
   a plurality of edges, each of the plurality of edges connecting one of the plurality of supernodes to an attribute of one of the plurality of nodes, the edge corresponding to one of the set of potential hierarchical relationships.

5. The method of claim 4, wherein generating the second representation comprises:
   traversing the plurality of edges using a topological order.

6. The method of claim 5, wherein generating the second representation comprises:
   generating a plurality of non-recursive join queries.

7. The method of claim 1, further comprising:
receiving a plurality of additional integration rules;
incrementally updating the first representation with the plurality of additional integration rules.

8. The method of claim 7, wherein incrementally updating the first representation comprises:
executing the chase algorithm.

9. The method of claim 7, further comprising:
incrementally updating the data structure with the plurality of additional integration rules;
updating the second representation with the plurality of additional integration rules.

10. The method of claim 1, further comprising:
accessing a plurality of additional data sets;
incrementally updating the first representation with the plurality of additional data sets.

11. The method of claim 10, wherein incrementally updating the first representation comprises:
executing the chase algorithm.

12. The method of claim 10, further comprising:
incrementally updating the data structure with the plurality of additional data sets;
updating the second representation with the plurality of additional data sets.

13. The method of claim 1, wherein the integration rule is expressed in a declarative language.

14. A computer program product for information integration, the computer program product comprising a computer readable storage medium having program instructions embodied therewith, the program instructions executable by a processor to cause the processor to perform a method comprising:
receiving a plurality of integration rules;
accessing a first data set;
generating a first representation of the first data set based on the plurality of integration rules, the first representation being flat and comprising a plurality of records;
generating at least one index, the index encoding at least one hierarchical relationship among the plurality of records;
generating a second representation of the first representation based on the at least one index, the second representation comprising nested data; and
maintaining a data structure comprising a set of potential hierarchical relationships among the plurality of records.

15. The computer program product of claim 14, wherein the program instructions are further executable by the processor to cause the processor to perform a method comprising:
generating a plurality of non-recursive join queries.

16. The computer program product of claim 15, wherein the program instructions are further executable by the processor to cause the processor to perform a method comprising:
receiving a plurality of additional integration rules;
incrementally updating the first representation with the plurality of additional integration rules.

17. The computer program product of claim 16, wherein the program instructions are further executable by the processor to cause the processor to perform a method comprising:
incrementally updating the data structure with the plurality of additional integration rules;
updating the second representation with the plurality of additional integration rules.

18. The computer program product of claim 16, wherein the program instructions are further executable by the processor to cause the processor to perform a method comprising:
accessing a plurality of additional data sets;
incrementally updating the first representation with the plurality of additional data sets.

19. The computer program product of claim 14, wherein the first representation further comprises a plurality of index references and wherein generating the second representation comprises:
inlining the plurality of index references.

20. The computer program product of claim 14, wherein the data structure comprises:
a plurality of nodes, each of the plurality of nodes corresponding to one of a plurality of integration rules and comprising an attribute;
a plurality of supernodes, each of the plurality of nodes being associated with one of the plurality of supernodes;
a plurality of edges, each of the plurality of edges connecting one of the plurality of supernodes to an attribute of one of the plurality of nodes, the edge corresponding to one of the set of potential hierarchical relationships.

* * * * *